United States Patent [19]

Howard, Jr. et al.

[11] 4,405,760

[45] Sep. 20, 1983

[54] CHLORINATION AND CROSSLINKING OF SELECTED POLYMERS WITH CL$_2$O OR HOCL

[75] Inventors: Edward G. Howard, Jr., Hockessin; Frank D. Marsh, Wilmington, both of Del.

[73] Assignee: E. I. Du Pont de Nemours & Company, Wilmington, Del.

[21] Appl. No.: 334,910

[22] Filed: Dec. 28, 1981

[51] Int. Cl.$^3$ ............................................... C08F 8/20
[52] U.S. Cl. ................................ 525/383; 525/330.7; 525/332.3; 525/333.3; 525/333.7
[58] Field of Search ........................................ 525/383

[56] References Cited

U.S. PATENT DOCUMENTS

| | | | |
|---|---|---|---|
| 2,637,751 | 5/1953 | Brooks | 260/727 |
| 3,278,467 | 10/1966 | Burke | 260/3.5 |
| 3,872,176 | 3/1975 | Kochanny et al. | 260/658 R |
| 3,931,132 | 1/1976 | Low et al. | 260/92.1 |
| 3,932,370 | 1/1976 | Landi et al. | 260/83.3 |

OTHER PUBLICATIONS

Kirk-Othmer Encyclopedia of Chemical Technology, 3rd ed., vol. 5, Wiley-Interscience, 1979, at pp. 581 to 584.
Chem. Rev. 76 487 (1976), "The Chemistry of Chlorine Monoxide (Dichlorine Monoxide)", p. 503.
Tanner et al., J. Am. Chem. Soc., 89, 121 (1967).
Hahn et al., in CA, 84: 151182w (1976).
Klump et al., CA, 79: 67230z (1973).

Primary Examiner—Joseph L. Schofer
Assistant Examiner—Bernard Lipman
Attorney, Agent, or Firm—James A. Costello

[57] ABSTRACT

Contacting selected polymers with Cl$_2$O or HOCl to effect (1) substitution of chlorine for hydrogen bonded to carbon, and (2) crosslinking when the polymer contains carbon-carbon unsaturation.

23 Claims, No Drawings

CHLORINATION AND CROSSLINKING OF SELECTED POLYMERS WITH CL$_2$O OR HOCL

BACKGROUND OF THE INVENTION

The process of this invention effects substitutive chlorination and crosslinking of selected polymers employing Cl$_2$O or HOCl.

Chlorination of polymers can produce many desirable changes in properties, and chlorinated polymers are important articles of commerce. Chlorination of polymers, particularly of hydrocarbon polymers such as polyethylene, makes them more rubbery, increases their density, renders them more resistant to air and fire, and makes shaped articles less permeable to hydrocarbons such as gasoline. Crosslinking (curing) of unsaturated polymers is an important industrial method for producing elastomers. Such crosslinking can now be effected by the method of this invention.

Dichlorine monoxide, Cl$_2$O, also variously known as chlorine oxide, chlorine monoxide, and dichlorine oxide, will be designated throughout this description by its formula, to avoid confusion with other chlorine oxides. Hypochlorous acid will also be designated by its formula, HOCl. Cl$_2$O reacts with water to give HOCl, $$Cl_2O + H_2O \rightleftharpoons 2 HOCl$$

and can therefore be thought of as the anhydride of HOCl.

The Kirk-Othmer Encyclopedia of Chemical Technology, 3rd ed., Vol. 5, Wiley-Interscience, 1979, at pages 581 to 584, discloses two methods for making Cl$_2$O: (1) by reacting chlorine gas with mercuric oxide and (2) by reacting chlorine with moist sodium carbonate.

Cl$_2$O is a powerful chlorinating agent for organic compounds. It differs from conventional chlorinating agents such as molecular chlorine, Cl$_2$, in that the by-product of substitutive chlorination is H$_2$O, not HCl. Nevertheless, as pointed out by Renard et al. in Chem Rev. 76 487 (1976), "The Chemistry of Chlorine Monoxide (Dichlorine Monoxide)" page 503, there is little evidence in the literature of efforts to develop chlorination by Cl$_2$O as an industrial process.

Several publications that disclose reactions of Cl$_2$O or HOCl with various organic compounds are as follows:

Tanner et al. in J. Am. Chem. Soc., 89, 121 (1967) disclose reaction of Cl$_2$O with a 10:1 molar excess of 1-chlorobutane in CCl$_4$ at 40° C. under UV irradiation to give dichlorobutanes;

Kochanny et al., in U.S. Pat. No. 3,872,176, disclose reaction of Cl$_2$O with 1-chloroethane alone or in CCl$_4$ at 0° to 40° C. to give predominantly 1,1-dichloroethane and 1,1,1-trichloroethane;

Brooks, in U.S. Pat. No. 2,637,751, discloses reaction of HOCl with rubber to give hypochlorinated rubber in which HOCl appears to add to double bonds to give the chlorohydrin structure, —C(OH)C(Cl)—;

Burke et al., in U.S. Pat. No. 3,278,467, disclose reaction of HOCl with an isoolefin-multiolefin interpolymer to give chlorohydrin-containing interpolymers;

Landi et al., in U.S. Pat. No. 3,932,370, disclose reaction of HOCl or aqueous Cl$_2$ with a rubber such as acrylonitrile/butadiene copolymer, styrene/butadiene copolymer, polychloroprene, or polybutadiene. Patentees do not disclose crosslinking.

Hahn et al., in CA, 84: 151182w (1976), disclose preparation of poly(N-chloroacrylamides) by chlorination of the corresponding polyacrylamides with HOCl; and Klump et al., CA, 79: 67230z (1973), disclose preparation of N-chloro nylons by chlorinating polyamides with Cl$_2$O or HOCl.

It seems clear from the summaries presented above that Cl$_2$O has not heretofore been reacted with polymers, and that reactions of HOCl with polymers have been limited to production of N-chloro amides from polyamides and addition to carbon-carbon unsaturation in rubbers to give chlorohydrin configurations.

SUMMARY OF THE INVENTION

It has now been found that certain polymers that are substantially free of carbon-carbon unsaturation, particularly polyolefins, can be substitutively chlorinated by reaction with Cl$_2$O or with HOCl. It has also been found that polymers containing carbon-carbon unsaturation, particularly elastomers containing aliphatic C=C linkages and even polyvinylbenzenes such as polystyrene, can be crosslinked by reaction with Cl$_2$O or with HOCl. Polymers containing both saturated carbon(s) and C=C linkages can be crosslinked and substitutively chlorinated by the process of this invention.

By the term "substitutive chlorination" as employed herein to characterize the process of this invention is meant that chlorine atoms are substituted for hydrogen atoms bonded to carbon. The term specifically excludes reactions in which —OH and —Cl are added to double bonds and reactions in which chlorination takes place on nitrogen rather than carbon.

The term "polymer" includes copolymer, terpolymer, etc., and the term "copolymer" includes terpolymer, etc., depending on the context in which the term(s) are employed.

The process of this invention comprises contacting one or a mixture of selected organic polymers with Cl$_2$O or HOCl to effect substitutive chlorination at any saturated carbon that bears at least one hydrogen and to effect crosslinking with attendant chlorine addition across any carbon to carbon double bonds.

There is evidence, as reported in Examples 1, 2, and 4 hereafter, that the substitutive chlorination of this invention may take place substantially randomly in homogeneous liquid reaction systems. In this context, "random substitution" and "random chlorination" means that a carbon that becomes bonded to a chlorine by the process of this invention does not become bonded to a second chlorine until chlorine atoms have bonded to nearly all of the other carbon atoms available in the molecule.

DETAILS OF THE INVENTION

The Polymers

In general, any polymer that has a backbone composed predominantly of carbon atoms and is substantially free of carboxamide linkages and readily oxidizable groups such as hydroxyl and amino is operable in the chlorination process. Examples of such polymers include those which are substantially free of carbon-to-carbon unsaturation and those which have a combination of carbon-to-carbon unsaturation and saturated carbon wherein there is at least one replaceable hydrogen atom per repeating unit. Typical polymers of the former variety are polymers and copolymers of α-olefins of up to about 10 carbon atoms, such as polyethylene, polypropylene, poly(1-butene), polyisobutylene, and ethylene/propylene copolymer, and acrylic and vinyl polymers and copolymers containing repeating units derived from monomers such as methyl methacrylate, ethyl acrylate, acrylonitrile, methacrylonitrile, vinyl fluoride, and vinylidene fluoride. Polyolefins, particularly polyethylene, are preferred, because of the variety of established uses for chlorinated polymers of this type.

Typical polymers that have both saturated carbon and carbon-carbon unsaturation as described herein include uncured elastomers such as EPD (ethylene-/propylene/diene) elastomers, poly(2-chloro-1,3-butadiene), butyl rubber, and natural rubber, and polyvinylbenzenes such as polystyrene, polyvinyl(methyl)benzenes, and polyvinyl(chloro)benzenes.

The molecular weight of the polymer is not critical, nor is the steric configuration of a polyolefin like polypropylene or poly(1-butene) critical. The only limitation imposed by polymers of relatively high molecular weight or high tacticity is that those which are insoluble in solvents such as $CCl_4$ (carbon tetrachloride) may not be usable for chlorinations in homogeneous liquid systems. Such polymers, however, can be chlorinated in heterogeneous systems, and in some instances in $CCl_4$ above its boiling point in closed systems.

Process Variables

The process of this invention can be carried out in homogeneous liquid systems or in heterogeneous systems, including liquid-liquid, liquid-solid, and gas-solid systems. In addition to the embodiments of such systems shown in the Examples, chlorination with $Cl_2O$ or HOCl can be carried out on a melt, a colloidal suspension or a fluidized bed of a polymer. Although one of $Cl_2O$ or HOCl is charged to the reaction mixture, in the presence of water both chlorinating agents may be present.

The equivalent ratio of chlorinating agent to polymer will depend on the degree of chlorination that is desired and the degree of chain degradation (molecular-weight lowering) that can be tolerated. Since $Cl_2O$ has two chlorines available for chlorination, a mole of this compound is equal to two equivalents. The equivalent weights of polymer are determined by the number of CH, $CH_2$ or $CH_3$ groups per repeating unit as will be obvious to one skilled in the art.

In homogeneous liquid-phase chlorinations with $Cl_2O$ in boiling $CCl_4$ (temperature usually between 70° C. and 80° C.), it has been found that considerable chain degradation takes place when the degree of chlorination is more than an average of about 0.4 $Cl/CH_x$ where x is 1, 2, or 3. Usually, the equivalent ratio of chlorinating agent to $CH_x$ is about 1:0.25 to 1:20, and preferably it is about 1:1 to 1:10.

The temperatures used and times required for the chlorination process will depend on the polymer to be chlorinated, the chlorinating agent, and the physical nature of the chlorinating system. Chlorinations with $Cl_2O$ in boiling $CCl_4$ take place substantially instantaneously as the $Cl_2O$ is added to the polymer solution. With liquid-solid systems the reaction time is usually about 1 to 2 hours at 75° to 100° C. or about 1 to 5 days at ordinary temperatures or below.

Crosslinking of polymers with $Cl_2O$ is usually accomplished by contacting a shaped object or coating of the solid or semisolid polymer with gaseous $Cl_2O$ at ordinary temperatures. Times of a few minutes to about one hour usually suffice to give the desired degree of crosslinking. Crosslinking with HOCl is usually brought about by immersing a shaped object of the polymer in aqueous HOCl for a period of several hours to several days.

When the chlorination process is carried out in a homogeneous liquid system ($Cl_2O$) or a liquid-liquid heterogenous system (HOCl) the choice of solvents for the polymer is rather narrow, because of the high reactivity of the chlorinating agents, particularly $Cl_2O$. $CCl_4$ is the solvent of choice on the basis of its availability, solvent power, and inertness. Other solvents include perhalogenated chlorofluorocarbons such as $CCl_2FCCl_2F$ and $CCl_2FCClF_2$. $CHCl_3$ (chloroform) can be used for chlorinations at relatively low temperatures, but is less preferred because of its one hydrogen per molecule.

The amount of such solvent will be determined largely by the amount required to give a workable solution of polymer at the reaction temperature. For low-density polyethylene and atactic polypropylene the amount of $CCl_4$ used is usually about 5 ml to 50 ml per gram of polymer, and preferably about 10 ml to 25 ml per gram.

Common examples of heterogeneous liquid-solid reaction systems are those involving chlorination of a solid polymer with an aqueous solution of HOCl. The liquid:solid ratio here is not critical, assuming that enough liquid is used to give a workable mixture with the solid polymer. About 2 to 150 ml of aqueous solution per gram of polymer can be used. Times range from minutes to hours to days depending primarily on the temperatures employed.

The following Examples illustrate the process of this invention.

EXAMPLE 1

Chlorination of Polyethylene with $Cl_2O$

A mixture of 15 g of Alathon ®-10 branched-chain polyethylene and 250 ml of $CCl_4$ was heated at reflux with stirring under nitrogen for 3 hrs, to give a clear solution. When the solution was allowed to cool, small particles of solid precipitated. The mixture was heated to reflux again, whereupon the solid dissolved, and 90 ml of a solution of 6.3 g of $Cl_2O$ in $CCl_4$, which probably contained a minor amount of chlorine, was added dropwise with stirring over 20 minutes. A vigorous, exothermic reaction took place during the addition. A water trap was present to receive any off-gases during the reaction. No evolution of $Cl_2O$ was observed, and no HCl was found in the water trap (litmus indicator). When the reaction mixture was cooled to room temperature, no solid precipitated, which indicated that essentially no unchanged polyethylene was present, and that all crystallinity had been destroyed by random chlorination. The solution was allowed to evaporate in the hood at room temperature, to give 23 g of a clear, colorless, elastomeric chlorinated polyethylene, which apparently still contained a small amount of $CCl_4$.

The infrared absorption spectrum of a 3-mil (0.08 mm) hot-pressed film showed no bands corresponding to C=O or OH, which indicated that no oxidation had occurred.

Elemental analysis was run on a sample of the product that was dried at about 120° C./0.2 mm: C, 66.38, 66.37; H, 10.16, 9.98; Cl, 23.51; O, 0.2. The Cl value corresponds to an average of 0.12 Cl per carbon.

The inherent viscosity of a similarly dried sample was 0.89 (in CCl$_4$ at 25° C.), compared with a value of 1.04 for the starting material (in decalin at 35° C.).

Differential scanning calorimetry (DSC) on a similarly dried sample showed $T_m$ 47° C. during the heating cycle and $T_c$ 37° C. during the cooling cycle. This thermal behavior, particularly the absence of a principal melting point in the 80° to 100° C. range, indicated that the product was essentially randomly chlorinated, with concurrent loss of most of the polymer crystallinity. In confirmation, Hypalon® 45, a randomly chlorinated polyethylene made from Alathon®-10 and containing 25% Cl, showed similar melting behavior including $T_m$ 55° C. and $T_c$ 52° C. $T_m$ indicates a melting temperature in a polymer due to crystallinity, and $T_c$ indicates a temperature of crystallization.

NMR (nuclear magnetic resonance) indicated the presence of only about 0.3—CCl$_2$— per 1000 carbon atoms, corresponding to substantially random chlorination.

EXAMPLE 2

Chlorination and Chlorosulfonation of Polyethylene With Cl$_2$O and SO$_2$

A mixture of 7 g of Alathon®-10 polyethylene and 150 ml of CCl$_4$ was heated under reflux with stirring in an atmosphere of nitrogen until the polymer had all dissolved. Bubbling of SO$_2$ through the solution was begun, and then 80 ml of a CCl$_4$ solution containing 0.062 g of Cl$_2$O/ml and 0.027 g of Cl$_2$/ml was added over 35 minutes. The addition was made below the surface of the liquid to prevent reduction of Cl$_2$O by the SO$_2$ in the vapor phase. A rapid, exothermic reaction took place. The mixture was cooled, and the product was recovered by evaporation as in Example 1, to give 11 g of an elastomeric chlorinated and chlorosulfonated polyethylene.

The IR spectrum of a hot-pressed film showed no C—O bands, a sharp band at 8.6μ similar to that found in Hypalon® chlorosulfonated polyethylene and presumed to correspond to —SO$_2$Cl, and a very broad band at 9.3μ. Samples were dried in a vacuum oven for the following analyses:

Elemental analysis gave C, 52.94, 52.69; H, 7.79, 7.72; Cl, 36.65; S, 0.54, 0.70. These values correspond to a substituted polyethylene containing about 0.2 Cl per carbon and one SO$_2$Cl for about every 50 Cl's. Inherent viscosity was 0.77.

DSC showed no thermal event between −20° C. and 150° C., which corresponds to the DSC of Hypalon® chlorosulfonated polyethylene.

No —CCl$_2$— groups were detected by NMR (limit of detection 0.1 —CCl$_2$— per 1000 C), indicating substantially random chlorination.

EXAMPLE 3

Chlorination and Chlorosulfonation of Polyethylene With Cl$_2$O and SO$_2$Cl$_2$ A mixture of 7 g of Alathon®-10 polyethylene and 300 ml of CCl$_4$ was refluxed with stirring under nitrogen until the polymer had dissolved, after which 1 g of SO$_2$Cl$_2$ was added. Addition of 65 ml of a CCl$_4$ solution containing 0.0845 g of Cl$_2$O/ml and 0.0046 g of Cl$_2$/ml was begun immediately and carried out as in Example 2. A rapid, exothermic reaction took place. The reaction mixture was poured into an excess of methanol and the product was isolated by filtration and drying, to give 10 g of chlorinated polyethylene containing a minor proportion of chlorosulfonyl groups.

The product showed the same band at 8.6μ in the infrared as the product of Example 2, contained 37.56% Cl and 0.80% S, and showed no thermal events on heating from 0° C. to 150° C. and cooling from 130° C. to −20° C. by DCS.

EXAMPLE 4

Chlorination of Polyethylene With Cl$_2$O

In this Example, the mole ratio of CH$_2$ in the polyethylene to Cl$_2$O was about 15:1, compared with about 1:1 in Example 1.

A solution of 8.7 g of Cl$_2$O in 119 ml of CCl$_4$, which also contained 2.5 g of Cl$_2$, was added over 30 minutes with stirring to a solution of 1.4 g of Alathon®-10 polyethylene in CCl$_4$ at 75° C. The Cl$_2$O solution was introduced below the surface of the polyethylene solution. The clear solution that was obtained on cooling was allowed to evaporate, to give 3.5 g of chlorinated polyethylene.

A film pressed at 120° C. was hard, colorless, and transparent. Its infrared absorption spectrum had weak bands at 1730 cm$^{-1}$ and 1810 cm$^{-1}$ which probably corresponded to carbonyl function, indicating slight oxidation.

The inherent viscosity of the product was 0.175, which indicated extensive degradation of the chain. The product contained 33.05% C, 4.27% H, 59.37% Cl, and 0.62% O. The Cl value corresponds to an average composition of about CH$_{1.45}$Cl$_{0.55}$.

DSC between −30° C. and 160° C. showed glass-transition temperature ($T_g$) 45° C. on heating and 40° C. on cooling, indicating that chlorination was still essentially random at this level, destroying the inherent crystallinity of the polyethylene. Solubility of the product at ambient temperature also indicated random chlorination.

EXAMPLE 5

Reaction of Solid Polyethylene With Cl$_2$O

Polyethylene bottles were partly filled with a solution of Cl$_2$O in CCl$_4$ containing 0.086 g of Cl$_2$O/ml. One bottle was emptied and dried after 10 minutes, a second after 20 minutes, a third after 30 minutes, and a fourth after 24 hours, all at room temperature. The bottle treated for 24 hours gained 3.0% in weight corresponding to chlorination; the others showed no significant gain. Lead-free gasoline was then added to each bottle to a level no higher than the level of the Cl$_2$O/CCl$_4$ solution, and also to an untreated control bottle. Each bottle was capped and weighed periodically over 40 days. During this time the untreated bottle lost 31.1% of its gasoline, the bottles treated for 10 to 30 minutes lost 18.0 to 24.1%, and the bottle treated for 24 hours lost only 4.7%.

It can be assumed that gaseous Cl$_2$O was present in the free space above the liquid in each bottle during the period of treatment with the CCl$_4$ solution.

EXAMPLE 6

Chlorination of Polypropylene With $Cl_2O$

A slightly hazy solution of 5 g of A-Fax® 600 HL-5 atactic polypropylene in 200 ml of $CCl_4$ was prepared by essentially the method of Example 2. To this solution at 75° C. was added dropwise with stirring 200 ml of a solution of 4.37 g of $Cl_2O$ in $CCl_4$, which also contained 1.28 g of chlorine. A very fast reaction took place, as indicated by the loss of the characteristic color of the $Cl_2O$ and an increase in the rate of reflux. Some HCl was formed, probably from the $Cl_2$. Cooling and evaporation of the $CCl_4$ gave 12.4 g of chlorinated polypropylene. Samples for the following analyses were dried in a vacuum oven.

Inherent viscosity was 0.099, compared with 0.45 for the starting polypropylene. This result showed that chain scission had occurred.

The product contained 47.30% Cl, corresponding to an average composition $CH_{1.65}Cl_{0.35}$. DSC showed a $T_g$ of 29° C. on heating from $-40°$ C. to 180° C., compared with $T_g$ 44° C. for the starting polypropylene.

EXAMPLE 7

Chlorination of Polymethyl Methacrylate With $Cl_2O$

To a solution of 5 g of polymethyl methacrylate in 100 ml of $CHCl_3$, from which the alcohol had been removed, was added dropwise with stirring 30 ml of a solution of 2.1 g of $Cl_2O$ in $CCl_4$ over 30 minutes. The mixture was cooled, and the solvent was allowed to evaporate in a hood, to give 5.8 g of brittle chlorinated polymethyl methacrylate. The product contained 16.3% Cl, corresponding to an average of 0.55 combined Cl per methyl methacrylate unit.

EXAMPLE 8

Chlorination of Polyethylene with Aqueous HOCl

To a refluxing solution of 15 g of Alathon®-10 polyethylene in 250 ml of $CCl_4$ was added, dropwise with stirring, 70 g of aqueous 23% HOCl over 10 minutes. Stirring under reflux was continued for one hour, after which time the system was found still to contain unreacted HOCl (iodine color with aqueous sodium iodide). The hot mixture was poured into one liter of methanol with stirring, the mixture was stirred 10 minutes, and the liquid was decanted. The solid that remained was allowed to stand in 500 ml of methanol overnight, after which the liquid was decanted and the solid was dried in a vacuum oven, to give 25 g of chlorinated polyethylene.

A rubbery, 6.6 mil (0.17 mm) film was made by hot-pressing. Its IR spectrum had a very weak band in the carbonyl region at 5.7μ, indicating very slight oxidation.

DSC showed $T_g$ $-16°$ C. and endo $T_p$ 58° C. ($\Delta H_f$ $-0.1$ cal/g; very small) on heating and no activity on cooling. On reheating only the $T_g$ at $-16°$ C. was observed. The disappearance of the crystalline melting point of the starting polyethylene indicates that an amorphous, randomly chlorinated polyethylene was formed. $T_p$ indicates a peak temperature. The product contained 35.80% Cl, corresponding to an average composition $CH_{1.78}Cl_{0.22}$.

EXAMPLE 9

Chlorination of Solid Polyethylene With Aqueous HOCl

Aqueous HOCl was prepared by extracting a $CCl_4$ solution containing a known amount of $Cl_2O$ with a known amount of water. The $Cl_2O$ reacted with the water to give HOCl.

To a refluxing mixture of 1 g of Microthene® FN 510 branched-chain polyethylene (average particle size less than 20μ) and 100 ml of water was added 20 ml of what was formally a 2.5 M solution of $Cl_2O$ in water. The mixture was refluxed with stirring for 1.5 hours, cooled, allowed to stand overnight, and filtered. The solid product after drying was 1.23 g of chlorinated polyethylene. The product contained 20.28% Cl, corresponding to an average composition of about $CH_{1.9}Cl_{0.1}$.

DSC showed an endo $T_p$ 59° C. (shoulder, weak) and an endo $T_p$ at 98° C. (main peak) on heating, and an exo $T_p$ 84° C. (main peak) and endo $T_p$ 43° C. (shoulder) on cooling. On reheating an exo $T_p$ 99° C. was observed. The presence of the principal melting points at 98° C. and 84° C. shows that chemically nonrandom chlorination or physically heterogeneous chlorination or both has occurred.

EXAMPLE 10

Chlorination of Solid Polyethylene With Aqueous HOCl

The aqueous HOCl used in this Example was prepared as described in Example 9. A mixture of 100 mg of Microethene® FN 510 polyethylene and 10 ml of 2.5 M aqueous $Cl_2O$ was stored at 5° to 10° C. for five days, and the product was worked up as in Example 9. The chlorinated polyethylene thus obtained contained 50.17% Cl, corresponding to an average composition $CH_{1.61}Cl_{0.39}$.

DSC showed extrapolation onset temperature ($T_{eo}$) 46° C., $T_p$ 58° C., and a strong $T_p$ 92° C. on heating; and a strong $T_p$ 61° C. and a weaker $T_p$ 53° C. on cooling. On reheating the $T_p$'s appeared at 50° C. and 89° C. and $T_{eo}$ at 28° C.

EXAMPLE 11

Chlorination of Polyvinyl Fluoride with Aqueous HOCl

A mixture of 5 g of Du Pont powdered polyvinyl fluoride and 20 ml of aqueous 23% HOCl was stirred for 1 hour during heating on a steam bath. This was about the time required for the aqueous solution to wet the polymer. The mixture was filtered, and the solid product was washed with water and dried, to give 6.49 g of chlorinated polyvinyl fluoride. The polymer contained 20.00% Cl, corresponding to an average composition $C_2H_{2.68}Cl_{0.32}F$. It was hot-pressed to give a tan film.

EXAMPLE 12

Chlorination of Polyvinyl Fluoride with Aqueous HOCl

A mixture of 30 g of polyvinyl fluoride and 140 g of aqueous 23% HOCl was stirred at room temperature for 20 hours. During this time 400 ml (about 0.018 mole) of $Cl_2$ was evolved. The mixture was diluted with 300 ml of water and filtered, and the solid on the filter was suspended in one liter of water. After standing one hour the mixture was filtered, and the solid was air-dried to give 41 g of chlorinated polyvinyl fluoride as a white powder, which apparently still contained some water.

The product was pressed to a pale-yellow, uniform, transparent film at 170° C. Similar pressing of the starting polyvinyl fluoride would have given an opaque film. The product contained 14.16% Cl, corresponding to an average composition $C_2H_{2.79}Cl_{0.21}F$.

EXAMPLE 13

Crosslinking of Polystyrene with $Cl_2O$

A solution of 1.65 g (0.019 mole) of $Cl_2O$ in 22.9 ml of $CCl_4$ was added dropwise over 12 minutes to a solution of 2.0 g (0.019 mole monomer) of Bakelite ® BMD-3500 polystyrene in 40 ml of $CCl_4$ at 25° to 30° C. A white solid separated. After standing at room temperature overnight the mixture was filtered, and the solid was dried at 70° C./1 mm, to give 3.32 g of a light-tan powder. On attempted hot-pressing at 180° C., the solid turned brown but did not flow. An odor like that of chlorophenol was noticeable. The solid was only partly soluble in toluene. Anal. Found: C, 49.28, 48.99; H, 3.78, 3.93; Cl, 34.74, O, 5.75, 5.79. These results correspond to the average composition $C_8H_{7.5}Cl_{1.9}O_{0.7}$.

The properties of the product indicated that the polystyrene had been crosslinked, and the analysis suggested that the crosslinking reaction involved addition of $Cl_2O$ to benzene rings in different chains to link the chains by an oxygen bridge:

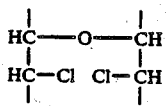

In addition, the analysis indicates that substitutive chlorination has also taken place.

EXAMPLE 14

Crosslinking of Uncured Ethylene/Propylene/Diene (EPD) Elastomers With $Cl_2O$

Plaques having the dimensions 3 in×5 in×1/16 in (8 cm×13 cm×0.16 cm) were made by hot-pressing three different samples of EPD elastomer (Nordel ® 2744, 1040, 1145). Respective viscosities of the 2744, 1040, and 1145 materials are as follows: ML 2+10 (302° F.): 33; ML 1+4 (250° F.): 40; and ML 1+4 (250° F.): 45.

The plaques, A, B and C, respectively, were hung in a treatment chamber at room temperature. Nitrogen was bubbled through a 6% solution of $Cl_2O$ in $CCl_4$ at room temperature, and the effluent gas stream was passed through the treatment chamber for 40 minutes. Properties of the treated samples are recorded in the following table.

|  | Plaque A | Plaque B | Plaque C |
|---|---|---|---|
| Weight gain, % | 10.2 | 11.2 | 12.4 |
| Permanent set, % | 36 | 45 | 16 |

Permanent set was determined essentially by the method described in ASTM D-412. "Dumbbell" samples were cut from the plaques and elongated on an Instron Model TM tester at 20 in (51 cm) per minute until the samples broke. After break the two parts of each sample were allowed to retract for 5 minutes at about zero stress, and the total percent elongation of the two parts was measured. This total elongation is the permanent set. The values for the untreated elastomers would be much higher.

Samples of the treated plaques were swollen in toluene to about double their original dimensions but remained largely undissolved. The low permanent set values and the swelling in toluene showed that treatment with $Cl_2O$ crosslinked the elastomers.

EXAMPLE 15

Crosslinking of Polymer Coatings with $Cl_2O$

An experimental paint vehicle comprising a copolymer of 25% methyl methacrylate, 25% styrene, 5% lauryl methacrylate, 5% acrylic acid, and 40% of a vinyl monomer containing pendent air-drying functionality linked through a heterocyclic ring was cast as a wet film on a glass plate from a 70% solution in butyl Cellosolve ®/butyl alcohol (80/20), and the film was dried at 70° C. At this point it weighed 0.114 g. It was treated with $Cl_2O$ vapor for 15 min at room temperature by essentially the method of Example 14, after which its weight had increased by 0.016 g (14%) and it was no longer soluble in the casting solvent.

In contrast, when a similar coating was treated in the same manner with $Cl_2$ gas, no increase in weight was observed.

EXAMPLE 16

Crosslinking of Polymers with HOCl

Films of uncured ethylene/propylene/diene (EPD) elastomers that were used to make samples A and C of Example 14 were immersed for 18 hours at room temperature in an aqueous HOCl solution similar to that of Example 9. After washing and drying they were found to have gained 13% and 16% in weight and to contain 0.35% and 0.42% combined oxygen, respectively. Both films had been converted to strong, tough, snappy elastomers.

EXAMPLE 17

Crosslinking of Polymers with HOCl

Three strips of film made from the elastomer used for sample C in Example 14 were immersed in a mixture of 50 g of $Ca(OCl)_2$ and 200 ml of water, and gaseous $CO_2$ was bubbled through the mixture for 15 minutes. The system was allowed to stand for three days, after which the films were removed, washed, and dried. The three films had gained 5.6%, 4.5% and 5.3% in weight. When they were slowly pulled, they did not draw the way the untreated film did, and eventually broke. They could be written on with a pen and ink, whereas with the original film the ink smeared badly.

EXAMPLE 18

Crosslinking of Polystyrene with Aqueous HOCl

A film of commercial polystyrene, when treated by the method of Example 16, gained 8.8% weight and became brittle.

EXAMPLE 19

Crosslinking of Polymer Coatings with HOCl

A dry film of the finish vehicle resin of Example 15 on glass, when treated by the method of Example 16, gained 13% weight and became hard and brittle.

The embodiments of the invention in which an exclusive property or privilege is claimed are defined as follows:

1. A process for the substitutive chlorination of one or a mixture of organic polymers having a backbone composed predominantly of carbon atoms and being substantially free of carboxamide linkages and readily oxidizable groups, said organic polymers additionally having one or both of these characteristics: (i) a repeating unit comprising at least one saturated carbon bearing at least one hydrogen, and (ii) a repeating unit comprising carbon-to-carbon unsaturation, the process comprising contacting the polymer(s) with $Cl_2O$ or HOCl, thereby substitutively chlorinating the polymer(s) at the saturated carbon, and crosslinking and adding chlorine across the carbon-to-carbon unsaturation.

2. A process according to claim 1 wherein the polymer(s) are substantially free of carbon-to-carbon unsaturation.

3. A process according to claim 2 wherein the polymer(s) are selected from one or more members of the group consisting essentially of (i) polymers and copolymers of $\alpha$-olefins of up to about 10 carbons, (ii) vinyl polymers and copolymers, and (iii) acrylic polymers and copolymers.

4. A process according to claim 3 wherein the polymer(s) are polymers and copolymers of $\alpha$-olefins of up to about 10 carbons.

5. A process according to claim 4 wherein the polymer(s) are selected from the group polyethylene, polypropylene, poly(1-butene), polyisobutylene and ethylene/propylene copolymer.

6. A process according to claim 5 wherein the polymer is polyethylene.

7. A process according to claim 5 wherein the polymer is polypropylene.

8. A process according to claim 3 wherein the polymer(s) are vinyl polymers and copolymers.

9. A process according to claim 8 wherein the polymer(s) are selected from polyvinyl fluoride and polyvinylidene fluoride.

10. A process according to claim 9 wherein the polymer is polyvinyl fluoride.

11. A process according to claim 3 wherein the polymer(s) are acrylic polymers and copolymers.

12. A process according to claim 11 wherein the polymer(s) are selected from polymethyl methacrylate, polylauryl methacrylate, polyethyl acrylate, polyacrylonitrile and polymethacrylonitrile.

13. A process according to claim 12 wherein the polymer is polymethyl methacrylate.

14. A process according to claim 1 wherein the polymer(s) have both saturated carbon and carbon-carbon unsaturation.

15. A process according to claim 14 wherein the polymer(s) are selected from one or more members of the group consisting essentially of ethylene/propylene/diene elastomers, poly(2-chloro-1,3-butadiene), butyl rubber, natural rubber, polystyrene, polyvinyl(methyl)benzene, and polyvinyl(chloro)benzene.

16. A process according to claim 15 wherein the polymer is polystyrene.

17. A process according to claim 15 wherein the polymer is an ethylene/propylene/diene elastomer.

18. A process according to any one of claims 1 to 17 comprising contacting the polymer(s) with $Cl_2O$.

19. A process according to any one of claims 1 to 17 comprising contacting the polymer(s) with HOCl.

20. A process according to claim 1 carried out in a homogeneous liquid system.

21. A process according to claim 20 comprising employing $CCl_4$ as a solvent.

22. A process according to claim 21 comprising substitutively chlorinating the polymer(s) in a random manner.

23. A process according to any one of claims 20, 21 or 22 comprising contacting the polymer(s) with $Cl_2O$.

* * * * *